(12) United States Patent
Fruhauf (10) Patent No.: US 7,413,129 B2
(45) Date of Patent: Aug. 19, 2008

(54) USB DEVICE WITH SECONDARY USB ON-THE-GO FUNCTION

(75) Inventor: Serge Fruhauf, Cupertino, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 480 days.

(21) Appl. No.: 10/954,777

(22) Filed: Sep. 30, 2004

(65) Prior Publication Data

US 2006/0065743 A1    Mar. 30, 2006

(51) Int. Cl.
G06K 19/06    (2006.01)

(52) U.S. Cl. .................. 235/492; 235/436; 235/441; 710/313; 713/1; 714/23

(58) Field of Classification Search ............ 710/313; 235/435–438, 441, 492; 713/1; 714/23
See application file for complete search history.

(56) References Cited

U.S. PATENT DOCUMENTS

| | | | |
|---|---|---|---|
| 6,732,218 B2 | 5/2004 | Overtoom et al. | 710/313 |
| 6,801,956 B2* | 10/2004 | Feuser et al. | 710/14 |
| 7,000,057 B1* | 2/2006 | Novell et al. | 710/306 |
| 7,127,541 B2* | 10/2006 | Govindarajulu et al. | 710/300 |
| 2003/0101298 A1 | 5/2003 | Chang et al. | 710/107 |
| 2003/0110342 A1 | 6/2003 | Chiang et al. | 710/316 |
| 2004/0010730 A1 | 1/2004 | Saito et al. | 713/600 |
| 2004/0019732 A1 | 1/2004 | Overtoom et al. | 710/313 |
| 2004/0083400 A1 | 4/2004 | Saito et al. | 713/500 |
| 2004/0088449 A1* | 5/2004 | Sakaki | 710/15 |
| 2004/0145878 A1 | 7/2004 | Wang | 361/785 |
| 2004/0162929 A1 | 8/2004 | Zolnowsky | 710/313 |

OTHER PUBLICATIONS

Remple ("USB on-the-go interface for portable devices"), Consumer Electronics, 2003. ICCE. 2003 IEEE International Conference on Jun. 17-19, 2003, pp. 8-9.*
"USB On-The-Go Basics", Application Note 1822. Maxim IC. Dallas Semiconductor. Dec. 20, 2002. /www.maxim-ic.com/an1822>.*
Koeman, Kosta. "Understanding USB On-The-Go". EDN Magazine. Nov. 22, 2001, pp. 79-80 and 82.*

* cited by examiner

*Primary Examiner*—Seung H Lee
(74) *Attorney, Agent, or Firm*—Lisa K. Jorgenson; Christopher F. Regan (57) ABSTRACT

A USB device includes first and second communications ports and a processor operable for configuring the first communications port for connecting to a USB host and configuring the second communications port as a USB master connecting to a USB slave device. The processor can be formed as a USB device controller operatively connected to the first communications port and USB On-The-Go device controller operatively connected to a second communications port for creating a point-to-point connection to the USB slave device.

14 Claims, 8 Drawing Sheets

USB DEVICE WITH SECONDARY USB ON-THE-GO FUNCTION

FIELD OF THE INVENTION

The present invention relates to the field of universal serial bus (USB) devices, and, more particularly, to universal serial bus devices adapted for use in USB portable devices or peripherals, including smart cards.

BACKGROUND OF THE INVENTION

Smart cards are plastic cards having an embedded Integrated Circuit (IC). That IC may be a logic circuit with its associated memories or a microcontroller with its associated memories and software, or a microcontroller with its associated memories and software coupled to a custom circuit block or interface.

To use the computing power of the IC, a smart card makes use of a full set of packaging technologies. For example, the die size varies from 1 $mm^2$ to 30 $mm^2$, but is limited because of the mechanical limitations imposed by the plastic construction of the smart card. The IC is attached to a lead frame and wire-bonding techniques are used to connect the IC pads to the lead frame contacts. Potting or other strengthening methods can be used to protect the IC against chemical and mechanical stresses during manufacturing and which are a part of everyday usage of a smart card.

Eight contacts are typically located on one side of the card. The smart card performs transactions with a smart card reader using a serial protocol. The mechanical and electrical specifications for a smart card are published by the International Standard Organization (ISO) as ISO7816-X standards, which have allowed the simple and mass produced magnetic stripe cards to evolve toward the smart card. This natural evolution has allowed smart cards, depending on the IC complexity, of course, to perform pre-paid accounting, cryptographic scheme, personal authentication using a PIN code, biometrics, and java scripts, for example.

ISO documents ISO 7816-1 Physical Characteristics, ISO 7816-2 Dimensions and Locations of the contacts, ISO 7816-3 Electronic signals and transmission protocols, ISO 7816-4 Interindustry Commands for Interchange, and ISO 7816-10 Electronic signals and answer to reset for synchronous cards are incorporated herein by reference.

In operation, smart card readers are recognized by the reader infrastructure or a host computer prior to performing any transaction involving a smart card. The infrastructure runs an application involving the smart card. The half duplex protocol between the smart card and the smart card reader, in which either the smart card sends information to the smart card reader or vice versa, cannot start until a smart card is in place and detected by the smart card reader. The infrastructure manages authentication or transactions for pre-paid cards in public telephony, for Bankcards in Point-of-Sale (POS) terminals and Automatic Teller Machines (ATM), for Pay TV providers in set top boxes, and for wireless telecom operators in Subscriber Identification Modules (SIM) used in Global System for Mobile (GSM) terminals. Except for SIM cards, all other smart card reader applications use a physical sensor to detect the smart card. This sensor tells the smart card reader when a smart card is in place, i.e., when the smart card lead frame contacts mate with the smart card reader contacts.

When the smart card reader has established that a smart card is in place, a power-up sequence begins. After this power-up sequence has finished, the smart card reader typically provides a clock to the smart card and releases a reset signal. The smart card then executes its stored Operating System (OS). The SIM card, on the other hand, is in place only once with the power-off and used constantly subsequent to its positioning.

The first application for smart card technology was the public telephone system. The smart card die size was typically less than 1 $mm^2$, and only memories and logic circuits were integrated in the IC. The smart card reader used all eight contacts to interface properly with the different smart card generations. When the smart card was inserted in the payphone, the telephone infrastructure authenticated the smart card and the telephone removed accounting "units" from the smart card.

The banking industry subsequently adopted smart cards. The die size was about 10 $mm^2$, and a microcontroller and its associated memories and software were integrated in the IC. The smart card reader used up to six contacts to interface properly with the different smart card generations. When a smart card was inserted in the ATM or the POS (point-of-sale), the smart card user was authenticated with a PIN code. The smart card could store different items, such as the balance of cash received from an ATM on a per week basis or details of purchases since a last closing date. Based on this information, authorization could be issued on the spot once the PIN had authenticated the debtor. This was accomplished without telephone calls to the bank.

Another application for smart cards has been developed by GSM manufacturers. The die size in a SIM is about 30 $mm^2$, and a microcontroller and its associated memories and software are integrated in the IC. The SIM reader uses five contacts to interface properly with the smart card. The more sophisticated smart card applications are performed in GSM using Java applets.

A new market for the smart card has emerged with the growth of the internet accessed from a personal computer. Secure message, Public Key Infrastructure, Authentication and Electronic Payment are new smart card areas of interest. The smart card acts as an e-commerce facilitator. One advantage of a smart card compared to other solutions is the smart card PIN located in its memory that is never communicated in any transaction.

Presently, a smart card is inserted into a smart card reader connected to a host computer. Two protocols are involved in supporting transactions between the smart card and host computer. The first protocol complies with the ISO-7816-3, which provides detailed requirements for the serial interface between smart card and smart card reader. The reader is connected to the computer via a serial port, a parallel port, or the Universal Serial Bus (USB), using a second protocol. The smart card reader contains electronic circuits and embedded software that enable communication between the smart card using the first protocol and the host computer using the second protocol. The host computer is loaded with any appropriate drivers to support the smart card reader.

Many countries have begun to use the smart card in the PC environment. The die size used in these applications ranges from 5 $mm^2$ to 30 $mm^2$ and the microcontroller and its associated memories and software are integrated in the IC typically with a cryptocontroller. Sometimes, a bio-sensor is integrated. The smart card reader uses at least five contacts to interface properly with the smart card in these applications.

Since the late 1990's, the universal serial bus (USB) has become firmly established and has gained wide acceptance in the PC marketplace. The USB was developed in response to a need for a standard interface that extends the concept of "plug and play" to devices external to a PC. It has enabled users to install and remove external peripheral devices without opening the PC case or removing power from the PC. The USB provides a low-cost, high performance, half-duplex serial interface that is easy to use and readily expandable.

USB uses four wires. The power supply is carried with two wires ($V_{BUS}$ and ground), and data is carried with the other two wires (D+, D−). Different versions of the USB are available, including the current Universal Serial Bus Specification, Revision 2.0, written and controlled by USB Implementers Forum, Inc., a non-profit corporation founded by the group of companies that developed the USB Specification and is incorporated herein by reference. A previous version is USB specification 1.1, the disclosure which is also incorporated by reference in its entirety. The increasingly widespread use of the USB has led smart card reader manufacturers to develop USB interfaces for connection of their products to host computers to complement the existing serial and parallel interfaces.

The USB specification has been created to connect up to 128 devices to a USB host or PC with a master-slave communication protocol. USB has many advantages in the "plug and play" arena and enhances ease of use for many devices. USB, however, has not been a replacement for many RS-232 or similar systems. For example, some prior art devices communicate point-to-point to one device and at the same time can be connected to a USB hub by using other serial communication protocols, such as 1394, SPI, or I2C for the point-to-point function. The IEEE 1394 protocol is very expensive compared to USB and I2C is slow for any high bandwidth application. SPI does not have adequate data integrity. It is also possible to use three devices including a USB hub that connects two USB devices and the communication between the devices is accomplished through the hub and controlled by the microcontroller behind the hub function. This is expensive. USB systems are host controlled. If the USB host is switched off, other devices on the system do not work. USB does not support peer-to-peer communications. As a result, one device on a bus must be the host.

Indeed many portable computing devices, for example, hand-held cellphones and digital cameras, operate as USB peripherals and connect to a personal computer (PC). These USB devices would benefit if they could also connect to other USB devices. The USB On-The-Go addendum to the USB specification allows a standard USB device to reverse the master-slave role with a particular USB hub or become a master for a USB peripheral device. As a result, the USB device functions as both the device controller (DC) and/or a host controller (HC). This protocol is described in the On-The-Go supplement to the USB 2.0 specification revision 1.0 of Jun. 24, 2003, the disclosure which is hereby incorporated by reference in its entirety.

These devices use the same USB port to be connected to a USB host or USB On-The-Go device. There are products or devices, however, that should be connected to a USB port of a PC at the USB device and at the same time communicate to another master or slave device. This device could be an enabler of the USB device. For example, the device and its secondary function could be an authentication function, an encryption or decryption algorithm for data transfer to the USB bus, or any other secondary function that enables or complements the USB device functionality. A USB On-The-Go device typically has only one USB port to which it can be connected to a USB host or to another USB device.

SUMMARY OF THE INVENTION

It is therefore an object of the present invention to provide a USB device that overcomes the disadvantages of the prior art as set forth above and can connect at the same time to a USB host and to a peripheral USB device and operate in a secondary USB On-The-Go function to provide a high bandwidth point-to-point connection with a USB slave device.

In accordance with the present invention, a USB device includes a data interface operable as first and second communication ports, for example, USB ports. A processor is operable for configuring the first communications port for connecting to a USB host and configuring the second communications port for connecting to a USB slave device. In the present claimed invention, the processor could be formed as an integrated circuit with microprocessor or microcontroller functions, and include other functions of a USB device controller and a secondary USB On-The-Go device controller for creating a point-to-point connection with the USB slave device.

In another aspect of the present invention, the processor is operative for implementing the Session Request Protocol (SRP) and requesting a USB device to begin a communication session. It can request a USB device to begin a communications session using this protocol by one of at least data-line-pulsing and Vbus pulsing. The processor is also operative for implementing the Host Negotiation Protocol (HNP) for transferring control from a default host to a default peripheral USB device.

In yet another aspect of the present invention, a memory stores a program operative for managing communications to the first communications port to a USB host and managing communications through the second communications port as a secondary function in accordance with the USB On-The-Go specification. This memory could be a flash memory, EEPROM, RAM or ROM memory, as non-limiting examples.

An integrated circuit for USB device is also disclosed and includes the data interface, USB transceiver and USB On-The-Go transceiver connected to the data interface. A processor is formed integral with integrated circuit and operable for configuring the USB transceiver and data interface for connecting to a USB host and configuring the On-The-Go transceiver and data interface as a USB master connecting to a USB slave device.

A smart card is also disclosed. It includes a smart card body and contacts carried by the smart card body. An integrated circuit is carried by the smart card body and comprises a data interface operable with the contacts. A USB transceiver and USB On-The-Go transceiver are connected to the data interface. The processor is operable for configuring the USB transceiver and data interface for connecting to a USB host and configuring the On-The-Go transceiver and data interface as a USB master connecting to a USB slave device.

A method is also disclosed in accordance with the present invention.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

The present invention advantageously combines the USB function and the USB One-The-Go function on the same USB device, which includes two USB ports, and controlled by a processor, including a respective USB device controller (USD) and a secondary USB On-The-Go device controller. The USB device controller can connect to a USB host. The secondary USB On-The-Go device controller can connect to a USB peripheral device and operate as a master, thus, maintaining a high bandwidth, point-to-point connection with a USB slave device. It should be understood that the present invention typically does not operate as a USB bridge device that will connect a device to a PC host via a USB bridge. The USB device connected to the USB On-The-Go part of the product is not seen from the PC host stack to which the product is connected via the USB port.

The present invention has several advantages, including a full-speed USB On-The-Go bandwidth function of about 12 Mb/s. This USB device provides On-The-Go function and can become a master of almost any secondary USB device, if it is part of a targeted list of peripherals that can be connected to the On-The-Go controller. Among the same class of devices, several devices can have several different functionalities and can be switched depending on the application. The present invention provides for operation under the USB standard and is especially applicable in the PC-handheld/PDA or smart card market segment. The USB device of the present invention also can manage a secondary USB device isolated from the USB tree, and thus, can integrate three devices into one. It also reduces costs because of the USB On-The-Go limited host capability. The USB device of the present invention can also isolate a security function and ensure its operation even if it is not connected to a USB host. The security function could be removable from the USB device. The connection between the USB "slave" device and the USB and On-The-Go device can be done on a printed board. It is not necessary to go through a USB plug and cable. It depends on the application. This can be used also to add functionality to a device very quickly without redeveloping a new device.

The present invention includes a processor that could be formed as an integrated circuit, for example, a USB microprocessor or microcontroller, including a USB device controller for the PC-hub USB connection, and a USB On-The-Go controller for the USB On-The-Go secondary function and connection operative as a master to a peripheral USB slave device. Both the USB and On-The-Go device controllers could be designed to include their own interface block operative with the microcontroller resources and could be optimized depending on the application bandwidth requirements. The size of any interface buffer and its accompanying architecture could be varied. Any microprocessor, microcontroller, central processing unit or other processor used in the present invention manages communication for the USB device to the USB host as a master and also manages communication at the secondary function, for example, security. The embedded software used for the invention could be stored in the memory of the processor, for example a flash, EEPROM, RAM or ROM.

The USB device controller could include and/or be operative with a USB transceiver. The controller would include an analog reception and transmission buffer for the data lines D+, D−, and a logic controller, which could include a serial interface engine (SIE), the logic and state machine for the USB protocol as part of the protocol management, and an interface layer to the application bus, which can be a general purpose peripheral bus of the processor. The On-The-Go controller could be similar in circuit architecture to the USB controller, but would also include additional circuitry to implement the Session Request Protocol (SRP) and the Host Negotiation Protocol (HNP). Any processor or controller would typically implement some restricted host functions and class drivers, and depending on the On-The-Go controller, would provide these functions in a software stack or hardware state machine to optimize performance.

Figure 1:
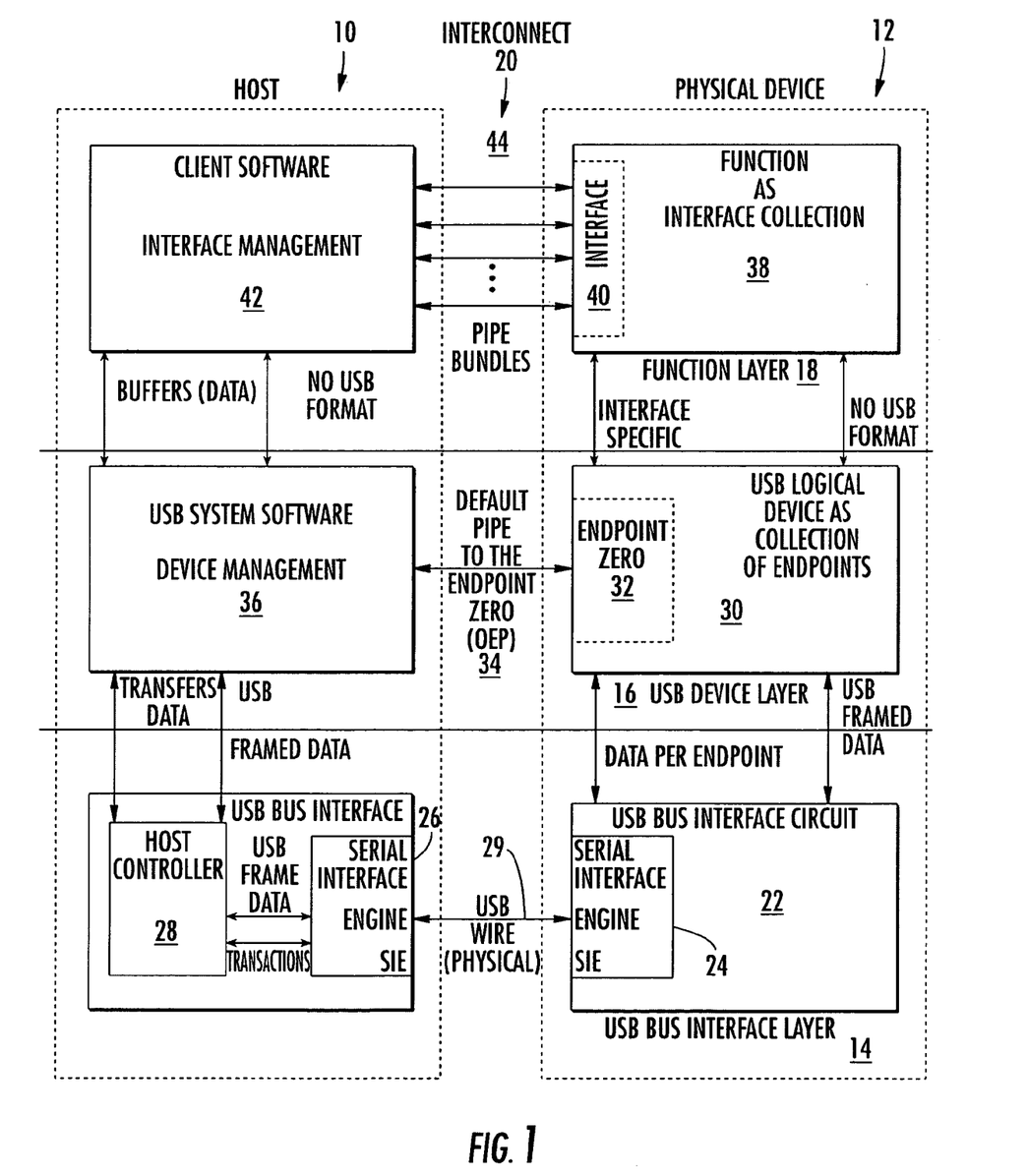
FIG. 1 is a block diagram of a USB host/device showing various transport mechanisms, pipes and the USB relevant format of transported data between the host and interconnected physical device as used in the universal serial bus specification.

For purposes of background and reference, a basic USB data flow between a USB host and a USB device and the various implementations and layers in accordance with Universal Serial Bus specification are set forth in FIG. 1.

As shown in FIG. 1, the connection of a host 10 to a physical device 12 requires the interaction between different layers, i.e., the USB bus interface layer 14, USB device layer 16, and function layer 18. An interconnect 20 between the host and device is illustrated.

The USB bus interface layer 14 includes a USB bus interface circuit 22 and serial interface engine (SIE) 24 at the device 12 that communicates with a serial interface engine (SIE) 26 and its host controller 28 at the host 10 via a physical wire 29. The USB device layer 16 includes at the physical device 12 a collection of endpoints as a USB logical device 30. An endpoint zero 32 is operable in communication via the default pipe 34 to USB system software 36 that is operable for device management at the host 10. The function layer 18 includes at the physical device 12 a logical function 38 as an interface collection. The interface 40 communicates via a plurality of pipe bundles 44 to client software 42 and is operable for interface management.

The USB bus interface layer 14 provides the physical wire 29 for the traffic signaling and packet conductivity between the host 10 and physical device 12. The USB device layer 16 views the USB system software 36 to perform generic USB operations with the physical device 12 via the default pipe 34 to endpoint zero 32. The functional layer 18 adds capabilities to the host using matched client software. The USB Device Layer 16 and Function Layer 18 each view logical communications within their layers and use the USB Bus Interface Layer 14 for any data transfer. The USB host 10 coordinates the overall USB system, controls access, and monitors the USB topology.

Logical communications exist between the client software and the Function Layer 18 and the USB system software 36 and USB logical device 30. Actual packets flow between the USB host controller 28 and the USB bus interface circuit 22.

As is known, USB physical devices add functionality to the host and have the same interface. Each physical device carries and reports configuration-related data, which it forwards to the host to allow the host to identify and configure the USB device. Typically, devices on the USB are connected to a host using a tiered star topology, including the hub. The host, on the other hand, communicates with each logical device as if it were directly connected to a root port. The client software manipulates a USB function interface of a device only as an interface of interest.

It should be understood that the actual communication flows across several interface boundaries. The two software interfaces for the host are a host controller driver (HCD) and a USB driver (USBD). A software interface between a USB host controller 78 and USB system software 76 implements the host controller driver and allows the host controller to implement functions without requiring the host software to be dependent on any particular implementation. One USB driver can support different host controllers. Specific knowledge of a host controller implementation is not required.

The USB logical device 30 can be considered a collection of endpoints and are grouped into endpoint sets to implement the interface. The USB system software 36 manages or controls the device using the default pipe 34 to the endpoint zero 32. Client software 42 manages the interface using pipe bundles 44 associated with an endpoint set. Data is moved between a buffer on the host 10 and an endpoint on the USB device 12 when client software requests the data. The host controller 28 or USB device 12, depending on the direction of data transfer, packetizes the data and forwards the packets over the bus. It also coordinates bus access. The host communicates with the physical device using a desired communication that is designed to match any communication requirements of the physical device and transfer characteristics provided by a USB.

The endpoint is an identifiable portion of the device that terminates the communication between the host. It can be a collection of independent endpoints. Default control uses input and output endpoints and the endpoint number "zero" as part of the default pipe 34.

The data transport mechanism includes transfers of data between the host controller 28 and the USB system software 36 at the host 10. Buffers can be used as a data transport mechanism between the USB system software 36 and the client software 42 at the host 10. The other data transport mechanism includes transactions between the host controller 28 and the serial interface engine 26 within the USB bus interface of the host.

The data transport mechanism also exists as a data per endpoint between the USB bus interface circuit 22 and the USB logical device 30 at the physical device 12. The data transport mechanism between the function 38 (and with the interface 40) and the endpoint zero 32 is interface-specific.

USB-relevant format of transported data occurs as USB frame data between the serial interface engine 26 and the host controller 28 and between the host controller 28 and the USB system software 36 at the host 10. No USB format of transporting data exists between the client software 42 that manages an interface and the USB system software 36.

At the device 12, USB-relevant format of transported data exists as USB frame data between the USB bus interface circuit 22 and the USB logical device 30. No USB format of data occurs between the interface 40 and the endpoint zero 32 at the device 12.

Further details of the functioning of the USB host and device and data flow can be found in the Universal Serial Bus specification, Chapter 5 entitled, "USB Dataflow Model," the disclosure which is hereby incorporated by reference in its entirety.

There now follows a brief description of using USB with a generic smart card device to enhance understanding of the present invention when used with a smart card. In accordance with the USB Specification, the host device operates as the master of the system bus, and all of the USB devices connected to the system bus operate as slave devices. A USB system bus includes two data lines D+ and D−, over which differential serial data signals are transmitted. Moreover, the USB system bus also includes a power line $V_{BUS}$ which may be used to provide an operating voltage from the host device to USB devices without their own source of power, as well as a ground line.

Accordingly, upon connection to the system bus, a USB smart card will receive power from the power line $V_{BUS}$ which will cause its processor to initialize and announce its presence so that the host device will recognize the device. This is done by connecting a predetermined voltage (e.g., 3.3 V) as an attachment signal to one or both of the data lines D+, D− via a respective pull-up resistor depending upon the data transfer speed at which the smart card is to operate. In particular, the USB Specification defines three data transfer rates, namely low speed (1.5 Mb/s), full speed (12 Mb/s), and high speed (480 Mb/s).

Generally speaking, once the USB smart card is recognized by the host device, the smart card will send information identifying itself and its capabilities to the host device when prompted. This information is incorporated within various descriptors, namely device descriptors, configuration descriptors, interface descriptors, endpoint descriptors, and (optionally) string descriptors. Further information on USB descriptors may be found in the incorporated by reference USB Specification. The host device will interpret this data using an appropriate driver and inform the smart card what configurations and system resources it will be allotted during the current session. The smart card uses this information to enumerate itself for use in the system.

One particularly advantageous approach for managing pull-up connections to differential data lines is disclosed in U.S. Application Ser. No. 2002/0066791 to Leydier et al., and which is hereby incorporated herein in its entirety by reference. In particular, this application is directed to a smart card which has an IC with voltage conditioning circuitry and a pull-up resistor. The smart card, when inserted in a smart card adapter coupled to a host device, is capable of signaling the host device over a bus using the integrated pull-up resistor selectively coupled to a voltage output of the voltage conditioning circuitry and a first output of the smart card.

The voltage conditioning circuitry output is selectively coupled to the first output through a resistor responsive to the device being powered by the bus (but not transmitting). This tends to pull up the first output to the voltage level of the voltage source, which makes the smart card capable of being properly detected by the host device upon the bus being driven by a host. Selectively disconnecting the pull-up resistor while the smart card is transmitting or receiving thus results in a more balanced differential output signal. Because the pull-up resistor and voltage conditioning circuitry supplying the proper voltage to the pull-up resistor are an integrated part of the IC, no separate contact is required to supply voltage to the resistor. This permits the smart card to be compatible with the contact configuration of certain existing smart cards, and eliminates the need for the pull-up resistor or voltage conditioning circuitry to be included in the smart card adapter.

Moreover, the device may also be detached from the system bus for other reasons. For example, the device may be detached to perform a re-enumeration, to conserve power, to reduce communications overhead processing by the host device, or when the $V_{BUS}$ power supply is not within the range specified by the USB Specification.

Because of the enhanced functionality afforded by the USB Specification and the significant computing power which may be included in USB smart card integrated circuits, it is possible not only to support multiple applications with a smart card, but also multiple configurations, such as endpoint configurations, for example. An example of a USB device which supports two different endpoint configurations is disclosed in U.S. Pat. No. 6,122,676 to Brief et al. In particular, this patent is directed to a USB device, which includes two mappings for relating a received token to an endpoint pipe. A host controller selects which of the two mappings the USB device will use during initialization or enumeration, and the host controller can also cause the USB device to change between the two configurations during operation.

Figure 2:
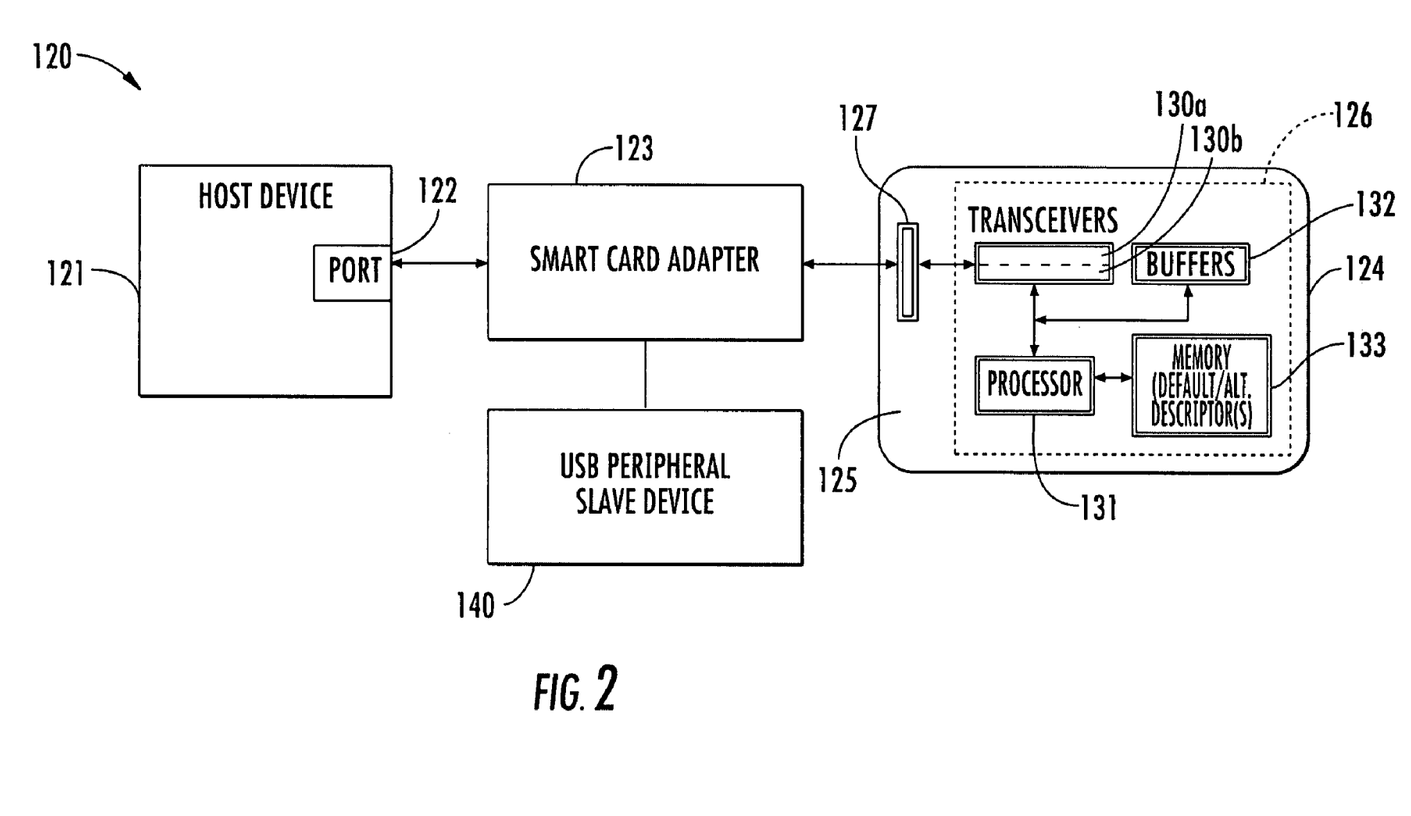
FIG. 2 is a schematic block diagram of a smart card system that can be modified for use with the present invention.

Referring now to FIG. 2, a smart card system 120 is described, including basic components that could be used for the present invention. The smart card system is described relative to USB, but the card could be a dual mode smart card operative in both ISO and USB mode. The smart card illustratively includes a host device 121 having a communications port 122, a smart card adapter or adapter 123 connected to the communications port and also operable to be connected to another USB peripheral slave device when a smart card is connected. A smart card 124 is read by the smart card adapter 123. Generally speaking, the host device 121 will be a computer of some type, which could be a personal computer (PC), laptop, etc., for example.

Of course, smart card systems take many forms, so the host device 121 could be any number of computing devices capable of interfacing with a smart card, such as a cable or satellite television receiver/decoder, an automated teller machine (ATM) or other banking machine, a point-of-sale (POS) device (e.g., a cash register), etc., depending upon the given application. Another example would be a personal data assistant (PDA) or other USB device that is ordinarily a slave to a USB bus master (i.e., host), but when used in a USB On-The-Go (OTG) mode can itself act as a limited USB bus master. Of course, in the present invention, the smart card would have the added functionality of the USB On-The-Go functionality.

In an ISO 7816 mode, the port 122 may be a serial communications port connected to the internal system bus of the host device 121 (not shown). In the case of a USB mode, the port 122 will be a USB port, which is also connected to the internal system bus of the host device 121, as will be appreciated by those of skill in the art. The smart card system 120 may advantageously be a USB system or a dual mode system which operates in both modes, for example, similar to the system described in U.S. Pat. No. 6,439,464 to Fruhauf et al., assigned to the assignee of the present invention, and which is hereby incorporated herein in its entirety by reference. Of course, other suitable smart card formats may also be used, as will be appreciated by those of skill in the art.

The smart card adapter 123 is of a type compatible with the particular operational protocol being implemented in the system 120 (e.g., a USB type card reader). The smart card adapter could be a passive ISO 7816 contact circuit with a fixed USB cable that plugs into a USB port 122. Of course, multiple readers 123 may be used, as well as multi-purpose readers, which read more than one type of smart card or multi-mode smart cards. In addition, the card reader 123 can be remotely located with respect to the host device 121, but it need not be. That is, in some embodiments the card reader 123 can be incorporated within the host device 121 or carried by a housing thereof, as will be appreciated by those of skill in the art. Additionally, in some embodiments the smart card adapter 123 may be incorporated into a smart card integrated circuit chip (see below), reducing the "reader" to little more that a "pass through" connector.

The smart card 124 including On-The-Go functionality illustratively includes a card body 125 and an integrated circuit (IC) 126 carried by the card body. Further, the smart card also illustratively includes contacts 127 for providing an electrical connection between the smart card adapter 123 and the IC 126. Of course, it will be appreciated that in some embodiments the smart card 124 may be wireless and thus not require the contacts 127. In such event, an antenna may be used instead of the contacts 127, for example. Thus, the use of physical contacts 127 on the card body 125 (and corresponding contacts at the card reader 123) will be assumed for purposes of the present discussion.

It should be noted that the smart card body 125 may be made of various types of materials and take various shapes. Perhaps the most common material used for smart cards is plastic, but other suitable materials may also be used. Moreover, smart cards are also generally rectangular in shape and thin enough to fit in a wallet, similar to a credit card, but again, other shapes and thicknesses may be used. The IC 126 may be encased within the card body 125, as illustratively shown, or it may be recessed therein but still exposed. Other mounting configurations are possible, as will be appreciated by those of skill in the art, which are anticipated by the present invention. It should also be noted that the smart card 124 may be incorporated or built into another device as a token or identification circuit therefor, for example.

More particularly, the IC 126 illustratively includes two separate transceivers, i.e., a regular USB transceiver 130a, and USB On-The-Go transceiver 130b which are connected to the contacts 127 and sends/receives signals to/from the host device 121 via the smart card adapter 123. The first USB transceiver 130a is operative with the processor 131 function of a USB device controller and connects to a USB host, in one example. The second transceiver 130b is operative with the processor 131 function of an On-The-Go device controller and connects to USB peripheral 140 as a slave device. The transceivers 130a, 130b are controlled by the processor 131, which also performs the various smart card operations.

Furthermore, buffer circuitry 132 can be included within the IC 126 for buffering signals transmitted between the IC and the host device 121 and/or peripheral slave device 140. There are two USB ports for this device. In the case of a smart card, the first port is connected to 123 with the interface 127. The second port is connected directly to the device 140. Both 140 and 125 could be in the same micromodule like a multi-chip package, or connected through a second smart card interface like 127. The memory 133 could include various descriptors and associated USB protocol data and data and protocol management for the On-The-Go functions, including Session Request Protocol (SRP) and the Host Negotiation Protocol (HNP). The circuitry could include random access memory (RAM) and non-volatile memory. The memory can include various look-up tables. It should be understood, however, that one transceiver could be used capable of working at low speed and/or full speed. For those applications that may use a chip-to-chip without USB cable, the transceiver can be reduced to a simple CMOS buffer input/output with the rise and fall time independent of the speed.

The USB On-The-Go supplement to the USB 2.0 specification allows consumers and/or corporate users to connect mobile devices to each other and/or to various other peripherals. The USB On-The-Go supplement gives function to a USB device to overcome the connectivity methods used by different manufacturers including Proprietary Docs, Dongles, Slots, Connectors, and different memory card technologies.

Figure 3:
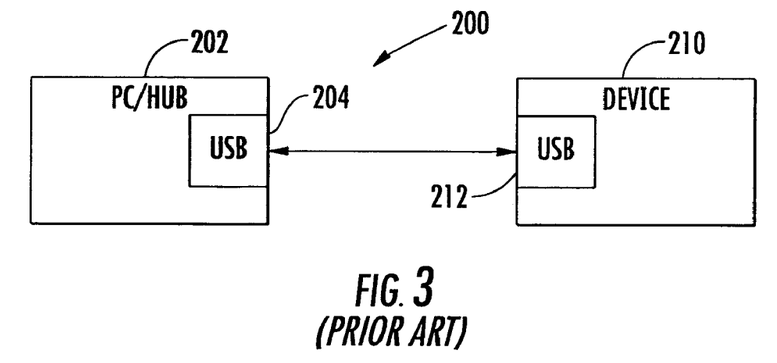
FIG. 3 is a block diagram of a prior art USB communications system and showing a point-to-point master-slave communication between the USB host or hub as a master and a peripheral USB device as the slave.
Figure 4:
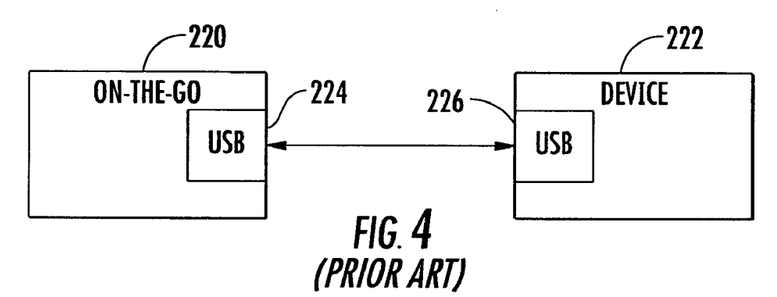
FIG. 4 is a block diagram of a prior art USB communications system and showing how use of the USB On-The-Go addendum to the USB specification allows a standard USB device to reverse the master-slave role with a particular USB hub or become a master for a particular USB device.
Figure 5:
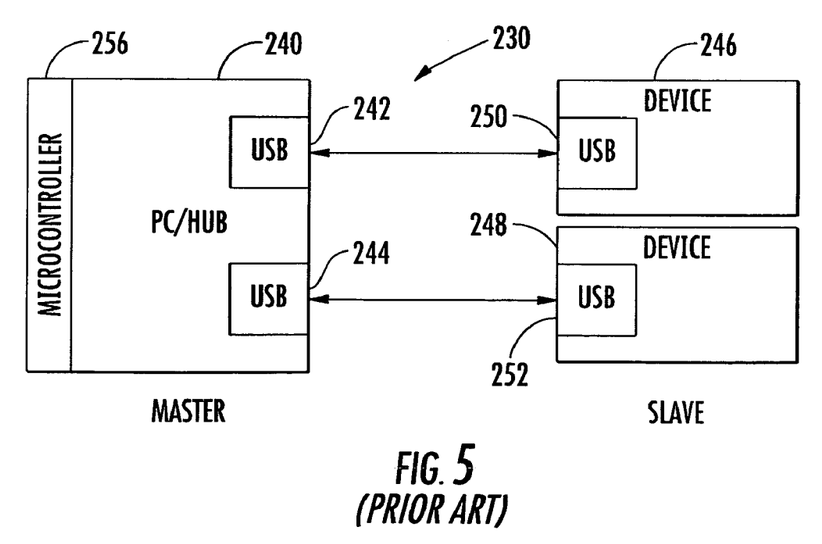
FIG. 5 is a block diagram of a prior art USB communications systems showing three devices in which a USB hub connects two USB devices and communicates between the two devices and controlled by a microcontroller behind the hub.

The drawbacks of existing systems are shown in FIGS. 3-5. FIG. 3 is a block diagram of a prior art point-to-point master-slave USB communications system 200, for example, using the USB 2.0 specification. The USB host or hub 202 includes a USB port 204 and is typically a personal computer or connected to a personal computer as a master, which in turn can connect up to 128 USB peripheral devices (slaves) 210, via a USB port 212 as shown in FIG. 3. The USB peripheral device 210 has no capability of acting as a master.

FIG. 4 is an improvement of the system 200 illustrated in FIG. 3 and shows that the USB On-The-Go addendum to the USB specification allows a standard USB device 220 to reverse the master-slave role with a particular USB hub or become a master for a particular USB device 222. Connections are made through the respective USB ports 224, 226.

Another prior art proposal is shown the USB communications system 230 of in FIG. 5, in which a USB hub 240 includes two USB ports 242, 244 and connects two USB devices 246, 248 through respective USB ports 250, 252. The communication between the two devices 246, 248 is accomplished via the hub 240 and controlled by a microcontroller 256 located behind a hub function. This type of system is expensive.

The USB On-The-Go specification adds host functionality for connection to USB peripherals and can be adapted for smart card use of the type as explained above. The specification details a "dual role device" that can function as a device controller (DC) and/or a host controller (HC). The Session Request Protocol (SRP) allows a B-device (as a peripheral) to "nudge" an A-device and "turn-on" the USB Vbus to communicate with each other. The Host Negotiation Protocol (HNP), on the other hand, allows either end to switch between a host and slave.

Different types of connectors can be used for upstream and downstream ports. A mini-A/B connector can allow a mini-A or mini-B connector to plug into one receptacle. A dual-role device operative in accordance with the On-The-Go specification allows a device to detect whether a mini-A or mini-B plug is inserted and determine if an ID pin, operative as an extra pin and introduced by the On-The-Go specification, is connected to ground. An On-The-Go descriptor from a B-device could describe whether or not the device could handle any Session Request Protocol and/or Host Negotiation Protocol. Any B-device that supports either the Host Negotiation Protocol or Session Request Protocol should be able to respond to the request.

It is evident that the USB On-The-Go specification allows two USB devices to communicate in a peer-to-peer connection without requiring the use of a personal computer as a host. As noted before, an On-The-Go dual role device can exchange roles as a host and peripheral. The Host Negotiation Protocol could determine how initial roles are determined and why any role reversal necessary. For example, the initial cable orientation could determine initial roles. The mini-A plug and mini-B plug and mini-A/B receptacle would add a fifth pin as an ID pin to give different electrical identities to cable ends. This ID pin would be connected to a ground inside the mini-A plug and left floating in the mini-B plug. The On-The-Go device receiving a grounded ID pin could be the default A-device (host) and the device with the floating ID pin could be the default B-device (peripheral). For example, a printer could be a default host as an A-device and a smart card could be the default peripheral (B-device). The smart card may have a printer driver and should act as a USB host to the printer, which contains no driver. Thus, instead of requiring the user to reverse the cable, the Host Negotiation Protocol would allow the roles to be reversed automatically. The Session Request Protocol would allow the B-device to request and A-device to turn on the Vbus power and begin a session. This could be defined as the time when the A-device is furnishing Vbus power.

The A-device could end the session by turning off the Vbus to conserve power in battery powered devices. A session request pulse could be generated which would pulse a D+ wire. A Vbus wire would wake up the A-device, which would respond either to the D+ or Vbus pulsing as shown in the On-The-Go transceiver block diagram of FIG. 10 and explained in detail below. The A-device could detect a pulse to cause it to switch-on the Vbus and start a session. The B-device typically would require that a session is not in progress by measuring Vbus and controlling the Vbus pulse to allow the possibility that it might be connected to a traditional USB host.

Figure 10:
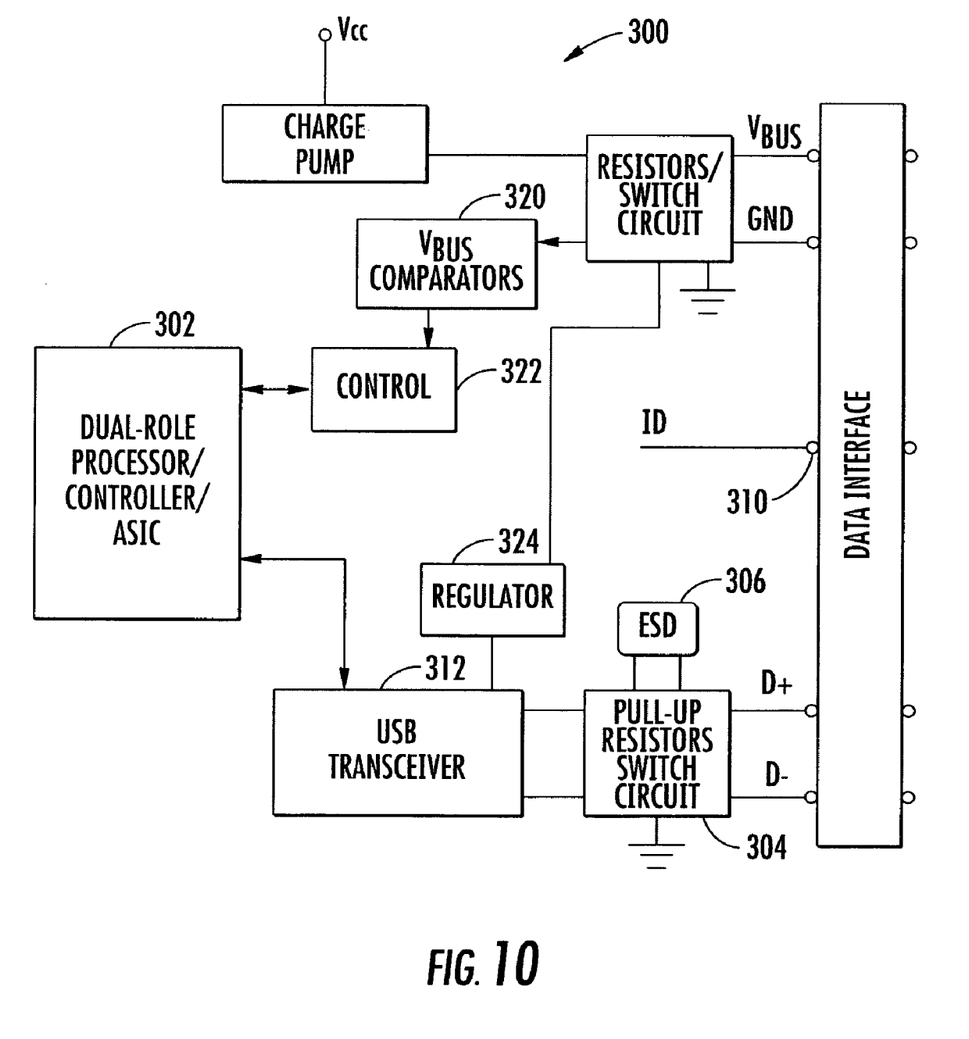
FIG. 10 is a schematic, block diagram of a typical On-The-Go USB transceiver that can be modified for use with the present invention.

FIG. 10 illustrates an On-The-Go transceiver 300, which could be modified for use with the present invention. The On-The-Go transceiver could include a dual-role processor 302, for example a microprocessor or Application Specific Integrated Circuit (ASIC), or a digital signal processor (DSP) with USB capability. The transceiver includes a switchable pull-up and pull-down resistor circuit 304 on D+/D− to allow peripheral host functionality. An ESD circuit 306 is operable with the pull-up resistor switch circuit 304 for electrostatic discharge protection. A 5-volt power supply Vcc could be on Vbus and connected through a charge pump circuit 307 and resistor/switch circuit 308 and operable as an A-device and monitor and pulse Vbus as a B-device initiating the Session Request Protocol.

An ID input pin 310 could be made available as an output to the processor 302 or Application Specific Integrated Circuit. The ASIC, DSP or other processor 302 that is connected to a USB transceiver 312. The transceiver should be capable of functioning as a peripheral host and switch roles on-the-fly. The transceiver circuitry could manage the Vbus pin which also supplies 5-volt power as a host and performs Vbus pulsing as a peripheral. Different switches, including analog switches, could configure the transceiver for the different roles. The circuit could include comparators 320, control circuit 322 and regulation circuit 324 as indicated.

Figure 6:
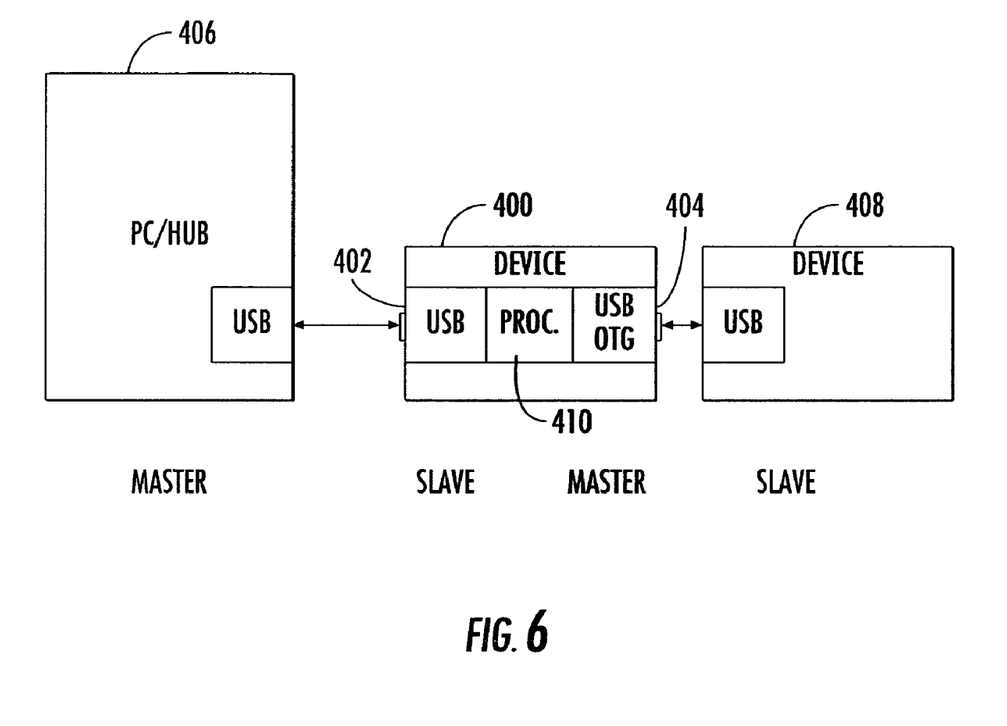
FIG. 6 is a high level block diagram of an example of a USB communications system of the present invention and showing a USB device having a processor that includes a USB device controller connected to a PC-hub USB connection and a USB On-The-Go controller operative for a secondary function and having a USB connection to a USB slave device.

In accordance with the present invention, FIG. 6 shows a USB device 400 of the present invention that includes first and second USB ports 402, 404. The first port 402 has a USB function. The second port has a USB On-The-Go function. The first USB port 404 can to be connected to a USB hub 406 and operates in the regular USB master/slave manner. The second USB port 404 can be configured and connected to a USB peripheral device 408 and acts as a master to the device 408. The processor/controller 410 with appropriate circuitry includes appropriate functions for operation, including any USB device controllers and USB On-The-Go device controllers.

Figure 7:
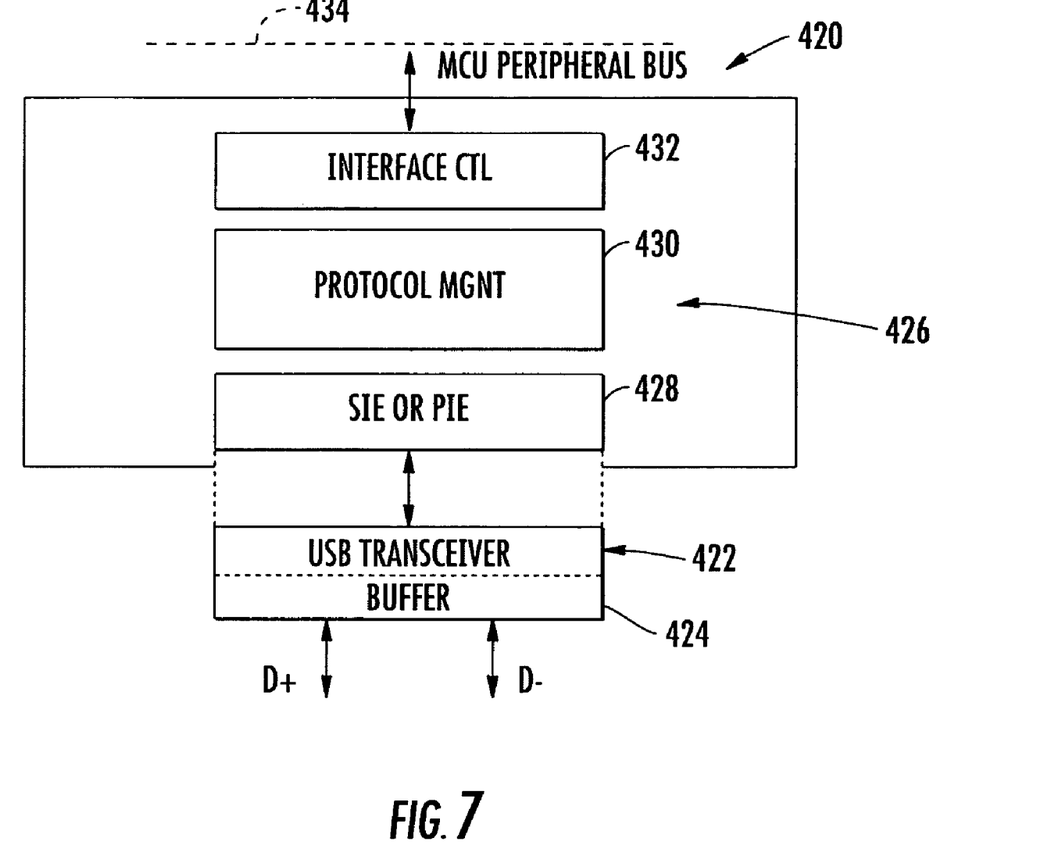
FIG. 7 is a high level block diagram of a USB device controller that can be used in the present invention.

A USB device controller 420 operable with the present invention is shown in FIG. 7 and includes a USB transceiver 422 that connects to a data interface, for example a D+ and D− connection. The device controller includes an analog and transmission buffer 424 for the data lines D+, D−. A logic controller 426 includes various functions, typically including a serial interface engine (SIE) 428, which could also be a parallel interface engine (PIE). The controller 426 includes circuitry for implementing protocol management 430, including and the logic and state machine for the USB protocol. An interface control layer 432 can be made to the peripheral or application bus 434 which is usually a general purpose peripheral bus of a microcontroller or CPU.

Figure 8:
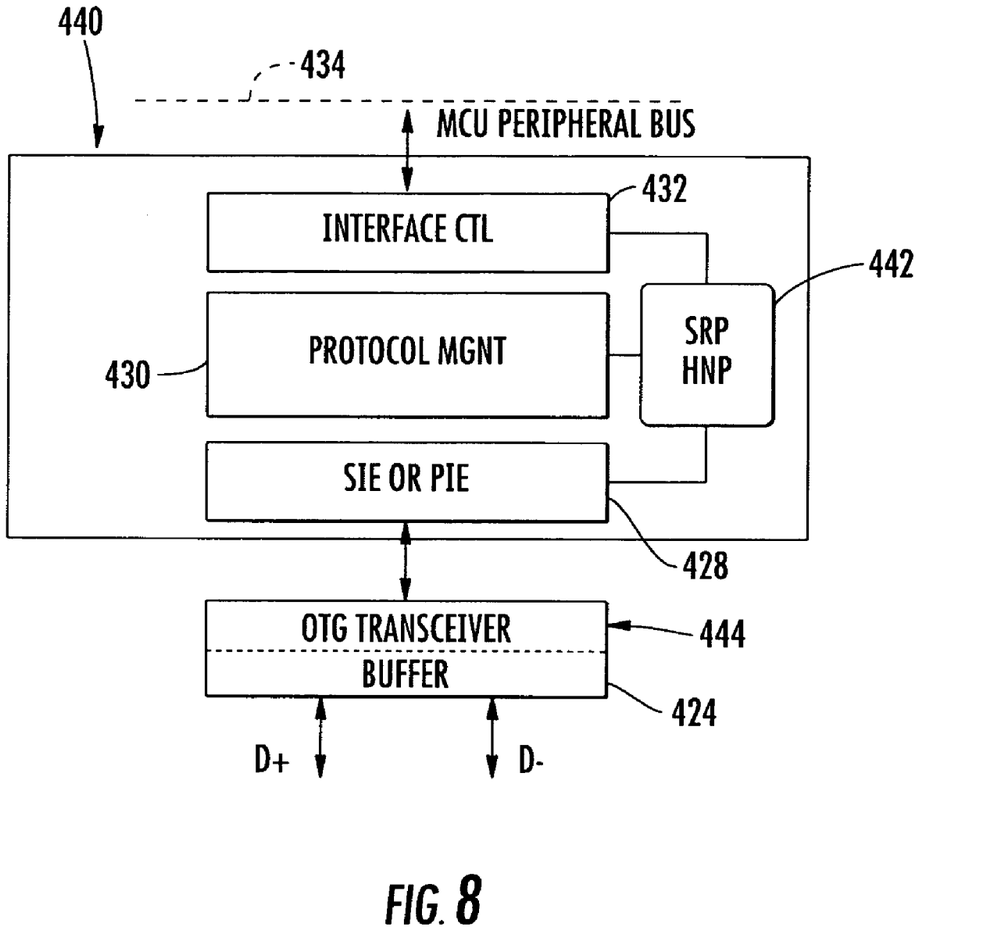
FIG. 8 is a high level block diagram of a USB On-The-Go device controller that can be used for the present invention.

An example of the On-The-Go device controller 440 is shown in FIG. 8 and includes similar components as the USB device controller illustrated in FIG. 7. Like reference numerals are used to show similar functional components. Additional functional circuitry 442 implements the Session Request Protocol and Host Negotiation Protocol and would implement some restricted host function and host drivers in cooperation with an On-The-Go transceiver 444. The On-The-Go controller 440 could provide these functions in a software stack or hardware state machine to optimize performance. Any processor, including a microcontroller or CPU, could manage communication for the USB device to the USB host/master and manage communication of the secondary function, security, for example. All embedded software could be stored in the processor, which could be flash memory, EEPROM, RAM or ROM.

Figure 9:
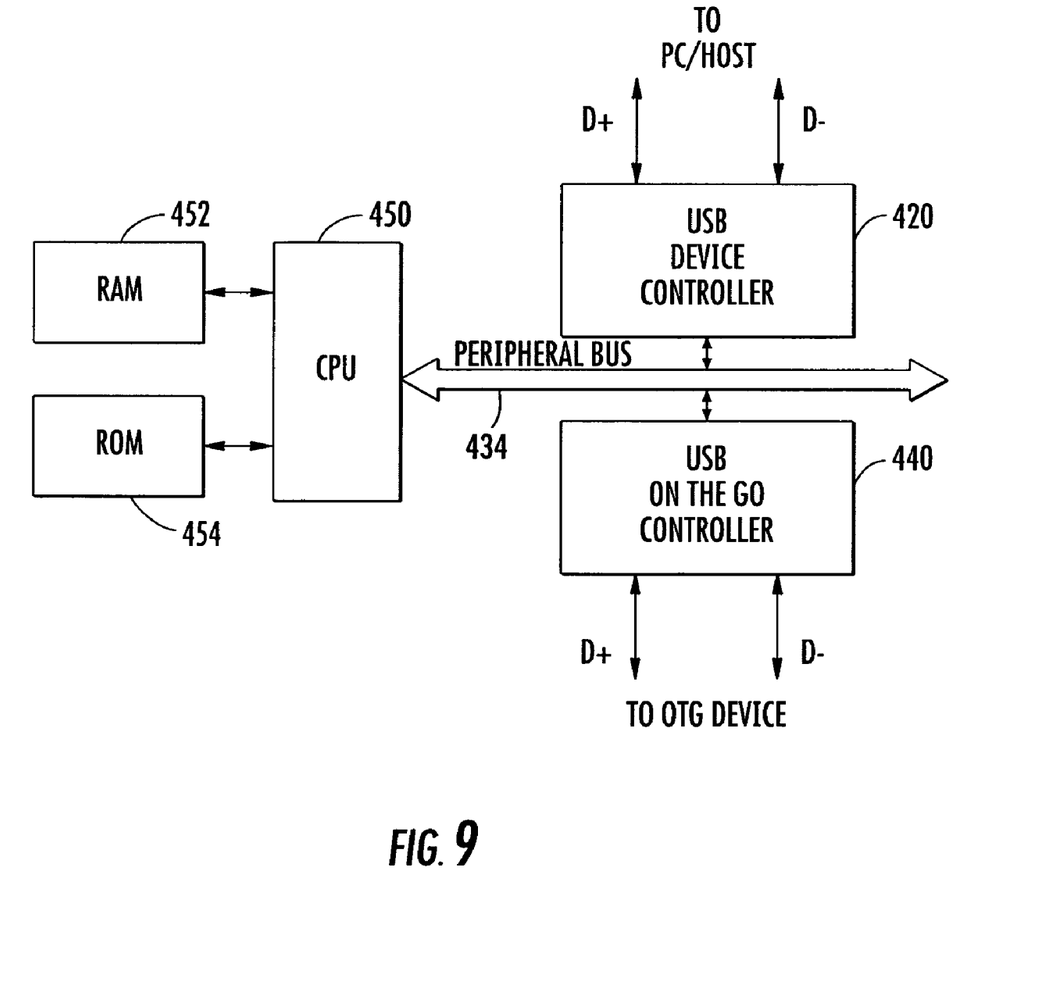
FIG. 9 is a high level block diagram showing basic components of the USB device of the present invention.

FIG. 9 is a high level block diagram of basic components of the USB device that can be used in the present invention and shows the USB device controller 420 and USB On-The-Go controller 440 that are both connected a data interface that includes D+/D− terminals. Both the USB device controller 420 and USB On-The-Go controller 440 connect to the peripheral or application bus 434 that connects to a processor 450 that could be any type of central processing unit, including a microprocessor or microcontroller. The memory includes at least RAM 452 and ROM 454 that are operative with the processor as explained before.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A USB device comprising:
first and second USB ports;
a USB device controller operatively connected to the first USB port and operable for configuring the first USB port for connecting to a USB host, said USB device controller further comprising a USB transceiver and logic controller including circuitry that implements protocol management for a logic or state machine, an interface control layer for interfacing with a peripheral or application bus, and a serial or parallel interface engine that interfaces with the USB transceiver;
a secondary USB On-The-Go device controller operatively connected to the second port and creating a point-to-point connection with a USB slave device, said USB On-The-Go device controller comprising a USB On-The-Go transceiver, a logic controller, and circuitry for implementing a USB On-The-Go protocol, including circuitry that implements protocol management for a logic or state machine, an interface control layer for interfacing with a peripheral or application bus, and a serial or parallel interface engine that interfaces with the USB On-The-Go transceiver, and a circuit for implementing the Session Request Protocol (SRP) and requesting a USB device to begin a session and Host Negotiation Protocol (HNP) for transferring control from a default host to a default peripheral USB device.

2. A USB device according to claim 1, wherein said USB On-The-Go device controller is operative for requesting a USB device to begin a session by one of at least data-line pulsing and Vbus pulsing.

3. A USB device according to claim 1, and further comprising a memory for storing a program operative for managing communications through the first USB port to a USB host and simultaneously managing communications through the second USB port as a secondary function in accordance with the USB On-The-Go specification.

4. A USB device according to claim 3, wherein said memory comprises a Flash, EEPROM, RAM or ROM memory.

5. An integrated circuit for a USB device comprising:
a data interface having first and second USB ports;
a USB device controller operatively connected to the first USB port and operative for configuring the first USB port for connecting to a USB host and comprising a USB transceiver and logic controller including circuitry that implements protocol management for a logic or state machine, an interface control layer for interfacing with a peripheral or application bus, and a serial or parallel interface engine operable with the USB transceiver and a USB On-The-Go device controller connected to the second USB port and operative for configuring the second USB port for connection to a slave device and comprising a USB On-The-Go transceiver connected to the data interface, including circuitry that implements protocol management for a logic or state machine, an interface control layer for interfacing with a peripheral or application bus, and a serial or parallel interface engine that interfaces with the USB On-The-Go transceiver, and a circuit for implementing the Session Request Protocol (SRP) and requesting a USB device to begin a session and Host Negotiation Protocol (HNP) for transferring control from a default host to a default peripheral USB device; and
a processor operable for configuring the USB transceiver and data interface for connecting to a USB host and simultaneously configuring the On-The-Go transceiver and data interface as a USB master for connecting to a USB slave device.

6. An integrated circuit according to claim 5, wherein said processor comprises a USB device controller and a secondary USB On-The-Go device controller for creating a point-to-point connection with a USB slave device.

7. An integrated circuit according to claim 6, wherein said processor is operative for requesting a USB device to begin a session by one of at least data-line pulsing and Vbus pulsing.

8. An integrated circuit according to claim 5, and further comprising a memory for storing a program operative for managing communications through the data interface to a USB host and simultaneously managing communications through the data interface as a secondary function in accordance with the USB On-The-Go specification.

9. An integrated circuit according to claim 8, wherein said memory comprises a Flash, EEPROM, RAM or ROM memory.

10. A smart card comprising:

a smart card body;

contacts carried by the smart card body;

an integrated circuit carried by the smart card body and comprising a data interface having first and second USB ports operable with the contacts;

a USB device controller operatively connected to the first USB port and operative for configuring the first USB port for connecting to a USB host and comprising a USB transceiver and logic controller including circuitry that implements protocol management for a logic or state machine, an interface control layer for interfacing with a peripheral or application bus, and a serial or parallel interface engine operable with the USB transceiver and a USB On-The-Go device controller connected to the second USB port and operative for configuring the second USB port for connection to a slave device and comprising a USB On-The-Go transceiver connected to the data interface, including circuitry that implements protocol management for a logic or state machine, an interface control layer for interfacing with a peripheral or application bus, and a serial or parallel interface engine that interfaces with the USB On-The-Go transceiver, and a circuit for implementing the Session Request Protocol (SRP) and requesting a USB device to begin a session and Host Negotiation Protocol (HNP) for transferring control from a default host to a default peripheral USB device; and a processor operable for configuring the USB transceiver and data interface for connecting to a USB host and simultaneously configuring the On-The-Go transceiver and data interface as a USB master for connecting to a USB slave device.

11. A smart card according to claim 10, wherein said processor comprises a USB device controller and a secondary USB On-The-Go device controller for creating a point-to-point connection with a USB slave device.

12. A smart card according to claim 10, wherein said processor is operative for requesting a USB device to begin a session by one of at least data-line pulsing and Vbus pulsing.

13. A smart card according to claim 10, and further comprising a memory for storing a program operative for managing communications through the data interface to a USB host and managing communications through the data interface as a secondary function in accordance with the USB On-The-Go specification.

14. A smart card according to claim 10, wherein said memory comprises a Flash, EEPROM, RAM or ROM memory.

\* \* \* \* \*